US008616574B2

(12) United States Patent
Monaco et al.

(10) Patent No.: US 8,616,574 B2
(45) Date of Patent: Dec. 31, 2013

(54) COMPACT ERGONOMIC MOBILITY CHAIR

(76) Inventors: Donald Monaco, Glendale Heights, IL (US); Maurice Haff, Daytona Beach, FL (US)

( * ) Notice: Subject to any disclaimer, the term of this patent is extended or adjusted under 35 U.S.C. 154(b) by 0 days.

(21) Appl. No.: 13/608,217

(22) Filed: Sep. 10, 2012

(65) Prior Publication Data

US 2013/0082456 A1 Apr. 4, 2013

Related U.S. Application Data

(60) Provisional application No. 61/533,309, filed on Sep. 12, 2011.

(51) Int. Cl.
*B62M 1/14* (2006.01)
*A61G 5/02* (2006.01)

(52) U.S. Cl.
CPC .................................... *A61G 5/022* (2013.01)
USPC .................................... 280/250.1; 280/304.1

(58) Field of Classification Search
USPC .......................... 280/249, 250.1, 304.1, 6.15
See application file for complete search history.

(56) References Cited

U.S. PATENT DOCUMENTS

| | | | | | |
|---|---|---|---|---|---|
| 4,569,094 | A | * | 2/1986 | Hart et al. | 5/87.1 |
| 4,620,714 | A | * | 11/1986 | Davis | 280/250.1 |
| 4,705,284 | A | * | 11/1987 | Stout | 280/250.1 |
| 4,809,804 | A | * | 3/1989 | Houston et al. | 180/65.51 |
| 4,811,964 | A | * | 3/1989 | Horn | 280/250.1 |
| 5,242,180 | A | * | 9/1993 | Bergeron | 280/250.1 |
| 5,340,139 | A | * | 8/1994 | Davis | 280/304.1 |
| 5,520,402 | A | * | 5/1996 | Nestor et al. | 280/250 |
| 6,062,600 | A | * | 5/2000 | Kamen et al. | 280/755 |
| 6,070,894 | A | * | 6/2000 | Augspurger | 280/249 |
| 6,440,046 | B1 | * | 8/2002 | Tholkes | 482/142 |
| 6,581,947 | B2 | * | 6/2003 | Andrews et al. | 280/266 |
| 6,851,751 | B1 | * | 2/2005 | Romero et al. | 297/331 |
| 7,077,416 | B2 | * | 7/2006 | Duarte | 280/304.1 |
| 7,281,724 | B1 | * | 10/2007 | Larson | 280/250.1 |
| 7,367,623 | B2 | * | 5/2008 | Tholkes et al. | 297/300.8 |
| 7,921,953 | B2 | * | 4/2011 | Irvine | 180/208 |
| 8,172,023 | B1 | * | 5/2012 | Irvine | 180/208 |
| 8,196,944 | B1 | * | 6/2012 | Vondrak | 280/250.1 |
| 2002/0038943 | A1 | * | 4/2002 | Kuroda | 280/250.1 |
| 2003/0227161 | A1 | * | 12/2003 | Redman et al. | 280/755 |
| 2005/0104319 | A1 | * | 5/2005 | Wing | 280/250.1 |
| 2005/0212255 | A1 | * | 9/2005 | Jansen | 280/304.1 |
| 2007/0278761 | A1 | * | 12/2007 | Firth | 280/250.1 |
| 2007/0296177 | A1 | * | 12/2007 | Porcheron | 280/250.1 |
| 2008/0054596 | A1 | * | 3/2008 | Johanson | 280/304.1 |
| 2009/0166996 | A1 | * | 7/2009 | Spindle | 280/250.1 |
| 2010/0207354 | A1 | * | 8/2010 | Hunziker | 280/304.1 |
| 2012/0255118 | A1 | * | 10/2012 | Hammond et al. | 5/86.1 |

* cited by examiner

*Primary Examiner* — Anne Marie Boehler
*Assistant Examiner* — Maurice Williams
(74) *Attorney, Agent, or Firm* — Berenato & White, LLC

(57) ABSTRACT

The present invention provides an ergonomic mobility chair comprising a frame, two primary wheels and at least one secondary load-bearing rolling point device. The primary wheels are usable for hand propulsion of the chair and positioned forward of the center of gravity of the chair. The primary wheels are mounted on a collapsible axle structure coupled to the frame. The at least one secondary load-bearing rolling point device is positioned aft of the center of gravity of the chair and coupled to the frame. A seat and two knee supports are coupled to the frame, the seat and the knee supports being arranged with respect to one another so as to position a user of the chair in a kneeling, upright, and generally neutral physiologic position. The seat and the knee supports each comprise at least a comfort cushion support coupled to the frame of the chair.

19 Claims, 8 Drawing Sheets

COMPACT ERGONOMIC MOBILITY CHAIR

CROSS REFERENCES TO RELATED APPLICATIONS

This application claims the benefit of U.S. Provisional Patent Application No. 61/533,309 filed on Sep. 12, 2011 in the name of Donald Monaco, et al., which is expressly incorporated herein by reference in its entirety.

FIELD OF THE INVENTION

The present invention relates, in general, to ergonomic wheelchairs and, more particularly, this invention relates to wheelchairs that are capable of rotation in a narrow passageway and travel with conventional wheel arrangement reversed.

BACKGROUND OF THE INVENTION

Ergonomics is about safe and efficient use of the human body, with minimum strain and in a way which is comfortable when working, cooking, driving, creating, or wheeling. Continuous muscular effort, even in the form of small exertions continuously held can be as stressful as brief, heavy effort. Leaning on armrests can put continuous load on your shoulders. This is an example of "static" exertion, which is often due to a poor relationship to the seat and back of a chair. Poor posture is an overexertion, wherein slumping or leaning forward causes the body's trunk, neck and shoulder muscles have to do a lot of continuous work. People often spend a lot of time leaning on armrests or a table due to lack of support with good posture in their chairs, resulting from improper seat angle and back angle. The optimal ergonomic posture is more upright, allowing the spine to support the body.

It is known in the art that to protect the health and well being of today's worker, it is necessary to organize the worker's environment around sound ergonomic principles. For many types of work, suitable seating that permits a worker to engage in assigned tasks with minimum physical stresses is considered essential. Such ergonomic principles apply equally to workers while confined temporarily or permanently by disability to a wheelchair. These principles are described in some detail in U.S. Pat. Nos. 6,644,748, 6,702,372, and 6,726,276 all of which are hereby incorporated by reference. The chair disclosed by Thoelkes et al. (U.S. Pat. No. 7,367,623) adheres to many of these ergonomic principles, but among other things, does not provide for mobility.

Prior to the conception and development of the present invention, as is generally well known in the related art, most wheelchair designs provide seating compatible with standard table height (about 30 inches), which limits the height to which the occupant can reach. Such designs do not generally support the optimal more upright ergonomic posture that allows the spine to support the body. In addition, most wheelchair designs are too large for rotation in a narrow passageway, which requires their operation forwards or backwards. During backward movement the occupant is more limited in terms of rearward visibility and operations that can be performed. One approach to addressing these problems is the reversible chair disclosed by Moran, et al. (U.S. Pat. No. 7,547,031). In Moran, et at the seat can be elevated to clear the top of the drive wheels and rotated for operation of the chair in a reverse direction, however, the seat arrangement does not provide for optimal ergonomic posture. The occupant may be able to use the elevation feature to gain greater reach in height, however doing so may result in instability, particularly if the occupant attempts to extend a more horizontal reach. It is stated in Moran that having the drive wheels forward of the guide wheels is preferable for use on rough ground or uneven surfaces. However, contrary to this, the rotating seat of Moran can configure the drive wheels aft of the guide wheels in some situations. A mobility chair capable of a turning maneuver in a narrow passageway, and proving for optimal ergonomic posture and greater occupant reach while maintaining stability, is needed.

SUMMARY

According to a broad aspect, the present invention provides an ergonomic mobility chair comprising a frame, two primary wheels and at least one secondary load-bearing rolling point device. The primary wheels are usable for hand propulsion of the chair and positioned forward of the center of gravity of the chair. The primary wheels are mounted on a collapsible axle structure coupled to the frame. The at least one secondary load-bearing rolling point device is positioned aft of the center of gravity of the chair and coupled to the frame. A seat and two knee supports are coupled to the frame, the seat and the knee supports being arranged with respect to one another so as to position a user of the chair in a kneeling, upright, and generally neutral physiologic position. The seat and the knee supports each comprise at least a comfort cushion support coupled to the frame of the chair. A bumper guard is coupled to the aft end of the frame.

In another aspect of the present invention, the seat of the ergonomic mobility chair is adjustably coupled to the frame by means of a height adjustment mechanism, comprising a first support post mounting the seat and coupled to the frame by a flexible device creating a pivot point, a second support post located substantially below the seat and coupled to the frame by a flexible device creating a pivot point.

In another aspect of the present invention, a distal end of the second support post is rotated forward to increase the seating angle with respect to the centerline of the frame. The distal end of the second support post is secured to the first support post after rotation by a locking member being selectively engageable with one of a plurality of connection points formed on the first support post.

In another aspect of the present invention, the collapsible axle structure maintains the wheels parallel to each other during collapsing operation.

In another aspect of the present invention, the knee supports are coupled to the frame by a flexible device creating a pivot point and can be rotated towards and away from the seat of the chair about a generally horizontal axis.

In another aspect of the present invention, the at least one secondary load-bearing rolling point device is one of a ball transfer and a caster coupled to the frame of the chair.

In another aspect of the present invention, the knee supports are coupled to the frame by a hinged mechanism comprising part of the collapsible axle structure.

In another aspect of the present invention, a forward tilt guard with one of a ball transfer and a caster is provided, the tilt guard being coupled to the frame by a position adjuster.

In another aspect of the present invention, hand supports are coupled to the first support post by a flexible device creating a pivot point and can be rotated towards and away from the seat of the chair about a generally horizontal axis.

In another aspect of the present invention, the collapsible axle structure is coupled to the frame either at the forward end of the frame or underneath and near the forward end of the frame.

In another aspect of the present invention, the structural components may comprise a plurality of materials including aluminum, steel, plastic, and composites.

DETAILED DESCRIPTION

Figure 1:
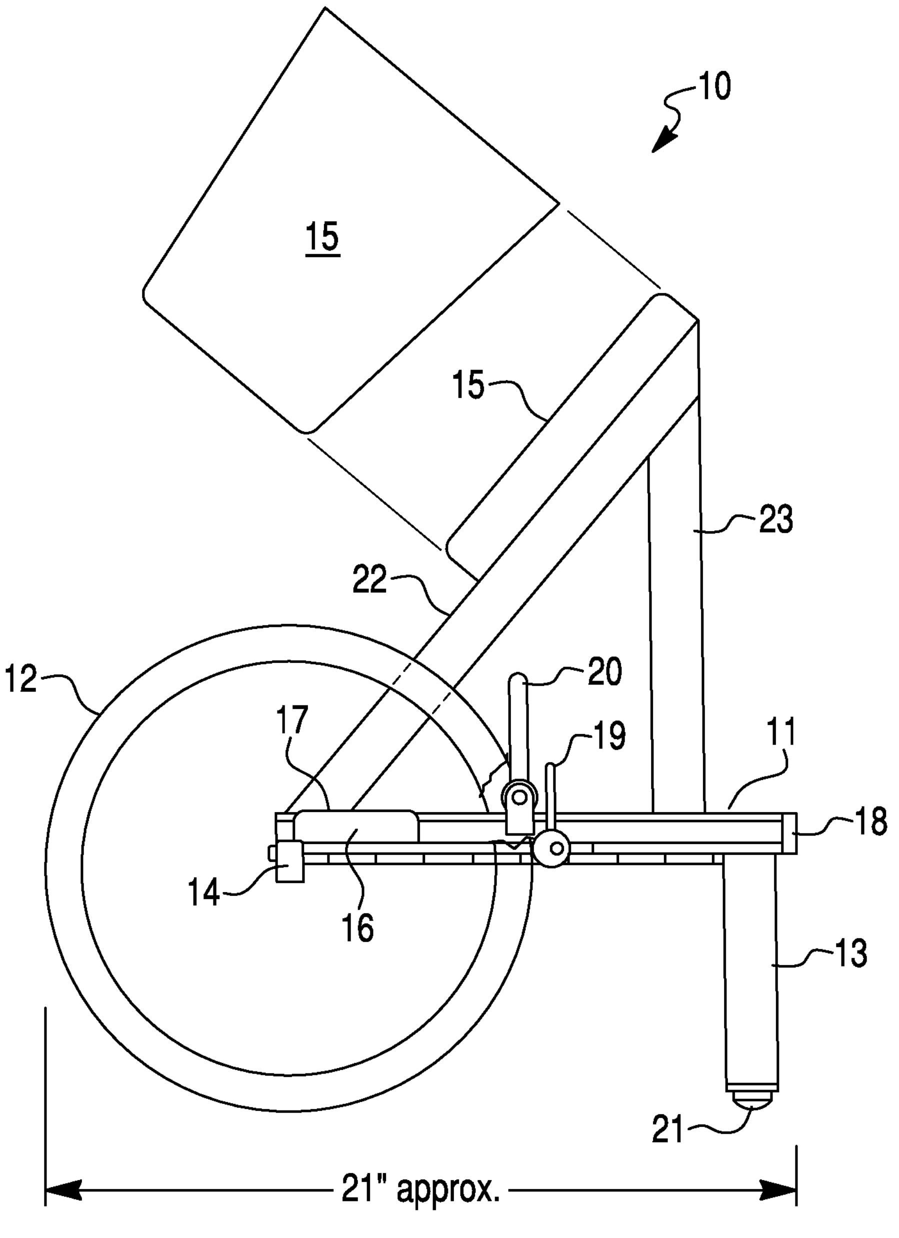
FIG. 1 is a left side view of an ergonomic chair of the present invention with a ball transfer.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and material changes may be made without departing from the scope of the present invention. The following detailed description is, therefore, not to be taken in a limiting sense, and the scope of the present invention is defined only by the appended claims and equivalents thereof.

Referring to FIG. 1, a left side view of an ergonomic mobility chair 10 of the present invention is shown comprising a frame 11, two primary wheels 12 and secondary load bearing support 13 having ball transfer roller 21. The primary wheels 12 are usable for hand propulsion of the chair 10 and positioned forward of the center of gravity of the chair 10. The primary wheels 12 are mounted on a collapsible axle structure 14 coupled to the frame 11. The secondary load bearing support 13 having ball transfer roller 21 is positioned aft of the center of gravity of the chair 10 and coupled to the frame 11. A seat 15 and a left knee support 16, and right knee support 17 are coupled to the frame 11, the seat 15 and knee supports 16 &17 being arranged with respect to one another so as to position a user (not shown) of the chair 10 in a kneeling, upright, and generally neutral physiologic position. The seat 15 and the knee supports 16 & 17 each comprise at least a comfort cushion support coupled to the frame 11 of the chair 10. A bumper guard 18 is coupled to the aft end of the frame 11. An eccentric friction brake 19 with collapsible handle for slowing or preventing movement of the chair 10 is shown positioned aft of the primary wheels 12. A platform stabilizer clamp 20 for locking the collapsible axle structure 14 in an outwardly extended position is shown approximately centered between the forward and aft ends of the frame 11. A seat 15 mounting post 22 and support post 23 are shown as fixed structures positioning the seat 15 at a 50 degree angle with respect to the frame 11.

Figure 2:
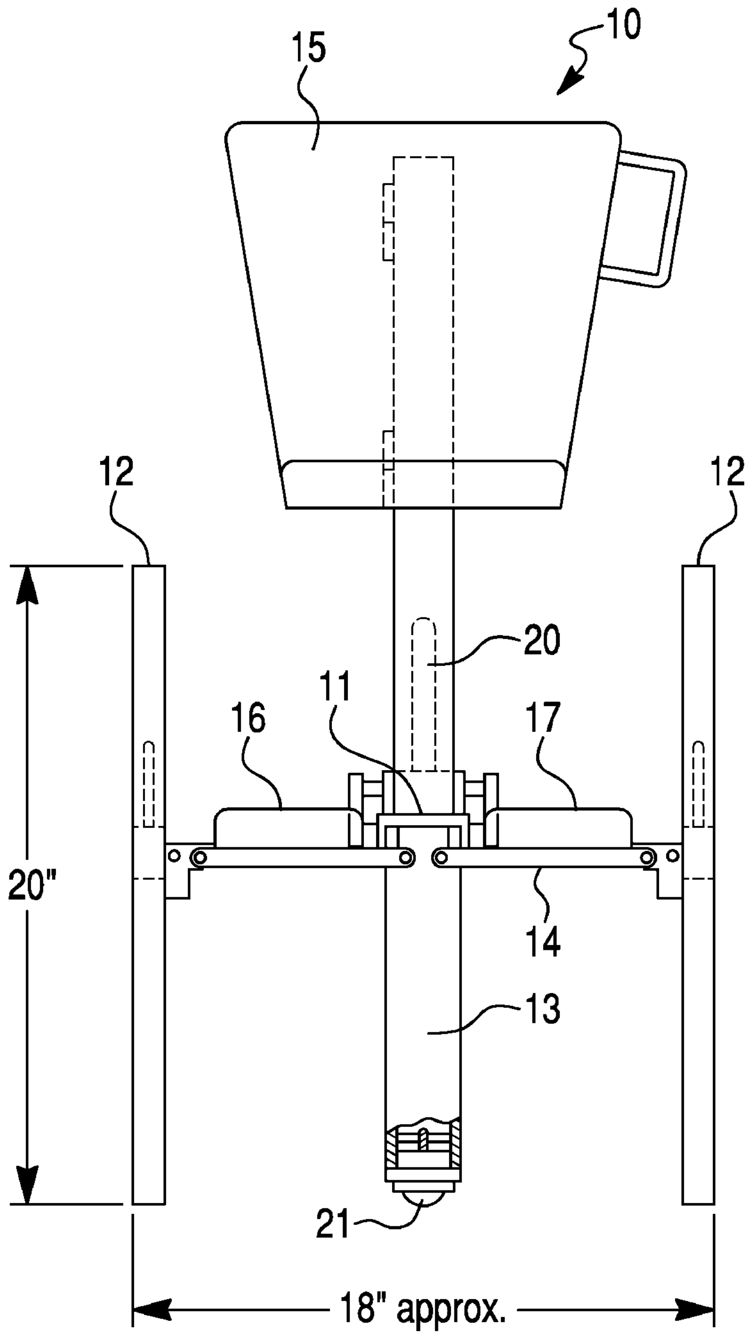
FIG. 2 is a front view of the ergonomic chair of FIG. 1.

Referring to FIG. 2, a front view of the ergonomic mobility chair 10 of FIG. 1 is shown comprising a frame 11, two primary wheels 12 and a secondary load bearing support 13 having ball transfer roller 21. The primary wheels 12 are shown mounted on a collapsible axle structure 14 coupled to the frame 11. The secondary load-bearing support 13 is coupled to the frame 11 and shown with a ball transfer 21. A seat 15 and two knee supports 16 & 17 are coupled to the frame 11, the seat 15 and the knee supports 16 & 17 being arranged with respect to one another so as to position a user (not shown) of the chair 11 in a kneeling, upright, and generally neutral physiologic position. The seat 15 and the knee supports 16 & 17 are shown as comfort cushion supports coupled to the frame 11 of the chair 10. The collapsible axle structure 14 is shown outwardly extended and locked in place by the stabilizer clamp 20.

Figure 3:
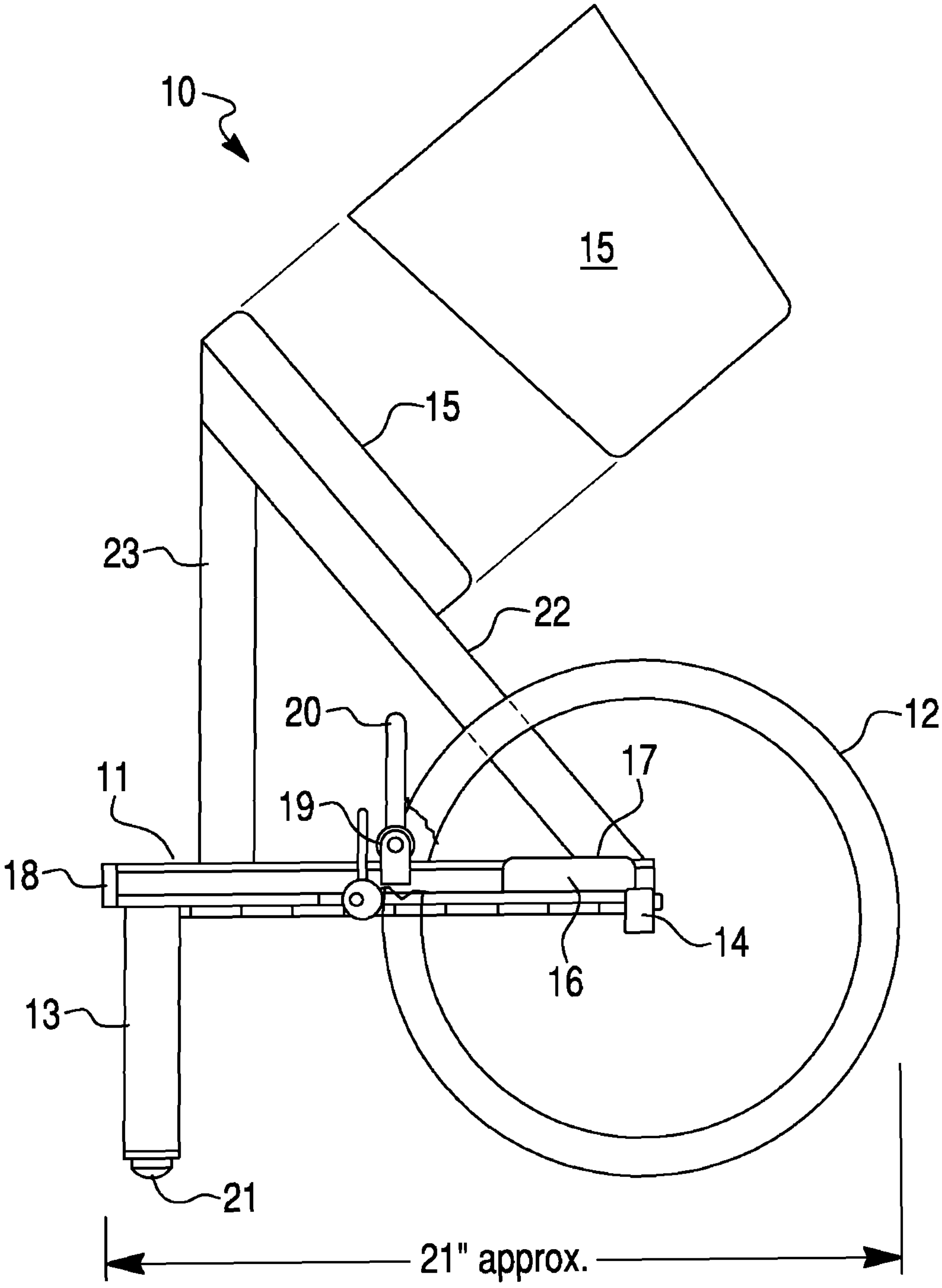
FIG. 3 is a right side view of an ergonomic chair of the present invention with a ball transfer.

Referring to FIG. 3, a right side view of an ergonomic mobility chair 10 of the present invention is shown comprising a frame 11, two primary wheels 12 and secondary load bearing support 13 having ball transfer roller 21. The primary wheels 12 are usable for hand propulsion of the chair 10 and positioned forward of the center of gravity of the chair 10. The primary wheels 12 are mounted on a collapsible axe 14 coupled to the frame 11. The secondary load-bearing support 13 is positioned aft of the center of gravity of the chair 10 and coupled to the frame 11. A seat 15 and two knee supports 16 & 17 are coupled to the frame 11, the seat 15 and the knee supports 16 & 17 being arranged with respect to one another so as to position a user (not shown) of the chair 10 in a kneeling, upright, and generally neutral physiologic position. The seat 15 and the knee supports 16 & 17 each comprise at least a comfort cushion support coupled to the frame 11 of the chair 10. A bumper guard 18 is coupled to the aft end of the frame 11. An eccentric friction brake 19 with collapsible handle for slowing or preventing movement of the chair 10 is shown positioned aft of the primary wheels 12. A platform stabilizer clamp 20 for locking the collapsible axle structure 14 in an outwardly extended position is shown approximately centered between the forward and aft ends of the frame 11. A seat 15 mounting post 22 and support post 23 are shown as fixed structures positioning the seat 15 at a 50 degree angle with respect to the frame 11.

Figure 4:
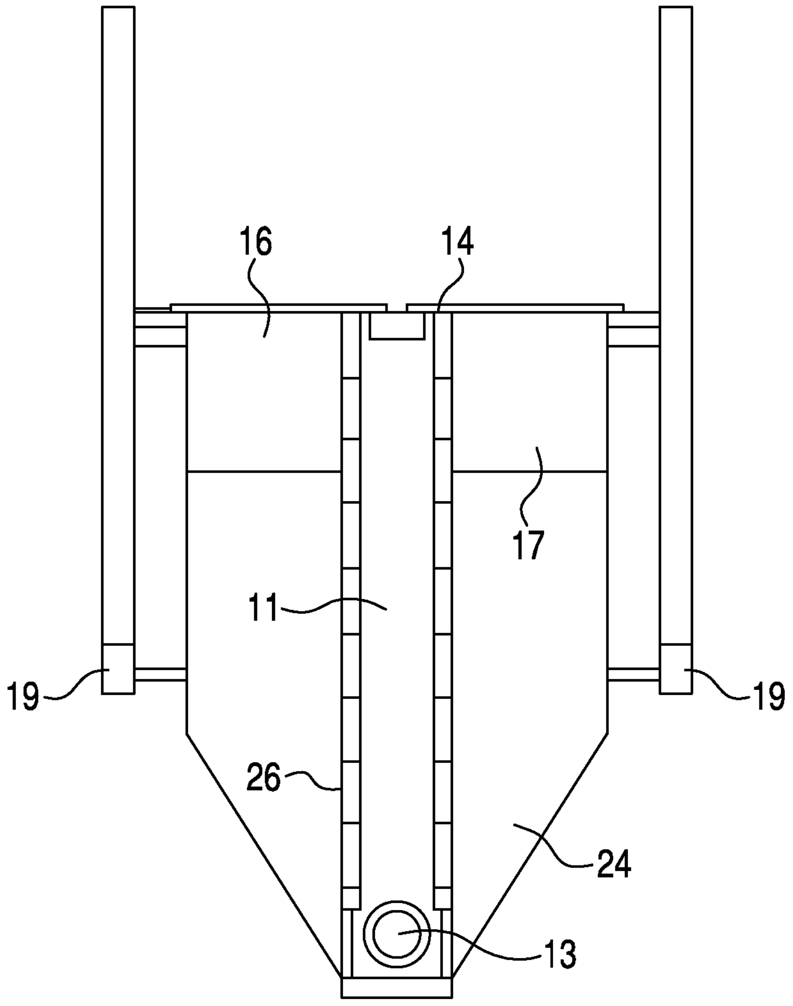
FIG. 4 is a top view of the ergonomic chair of FIG. 3.

Referring to FIG. 4, a top view of the ergonomic mobility chair 10 of FIG. 3 shows the knee supports 16 & 17 coupled to the frame 11 by a hinged mechanism comprising a leg support 24 and part of the collapsible axle structure 14, the hinge being a flexible device 26 creating a pivot point about which the leg support can be rotated towards and away from the seat 15 of the chair 10 about a generally horizontal axis. The flexible device 26 may be configured as a piano hinge or a series of separate hinges. The secondary load bearing support 13 is shown coupled the underside of the frame 11. The friction brakes 19 are shown positioned aft of the primary wheels 12. For clarity, the seat 15, mounting post 22, platform stabilizer damp 20, and support post 23 are not shown.

Figure 5:
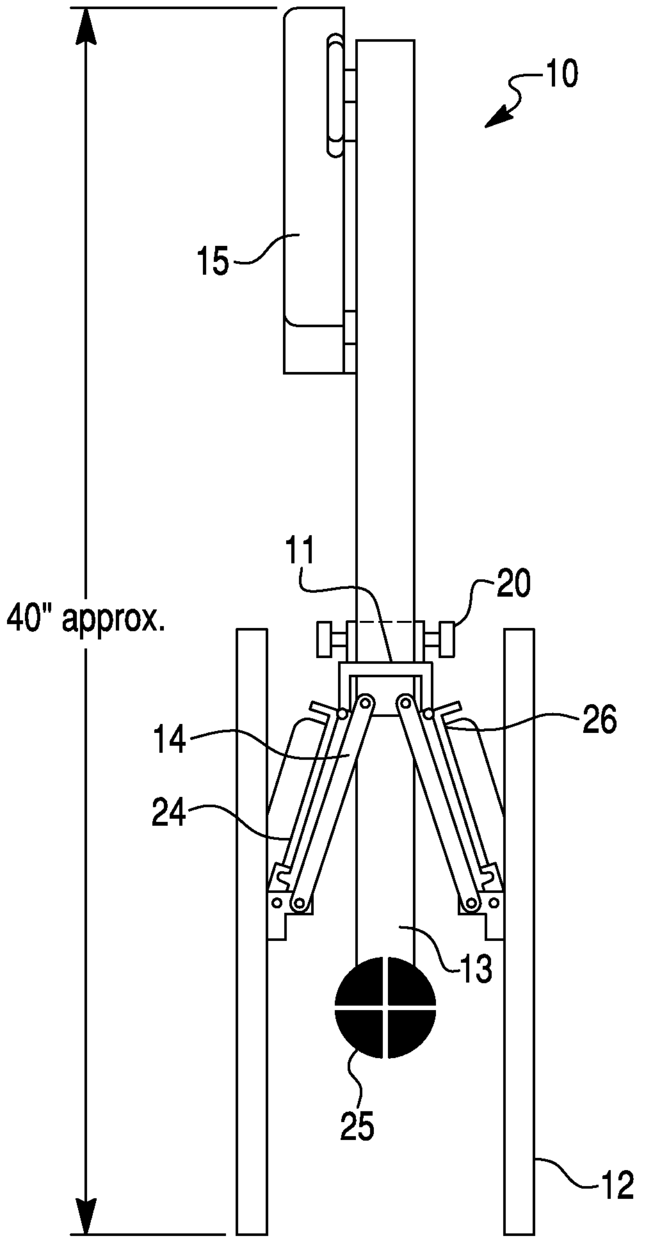
FIG. 5 is a front view of an ergonomic chair of the present invention with wheels shown in collapsed position.

Referring to FIG. 5, a front view of an ergonomic chair of the present invention shows the seat 15 cushion rotated to its storage position and the collapsible axle structure 14 collapsed while maintaining the primary wheels 12 parallel to each other during collapsing operation. The secondary load-bearing support 13 is shown configured as a caster 25 comprising a relatively small wheel and swivel. The platform stabilizer clamp 20 is shown positioned above the frame 11. The flexible device 26 is shown as the point of connection between the frame 11 and the leg support 24.

Figure 6:
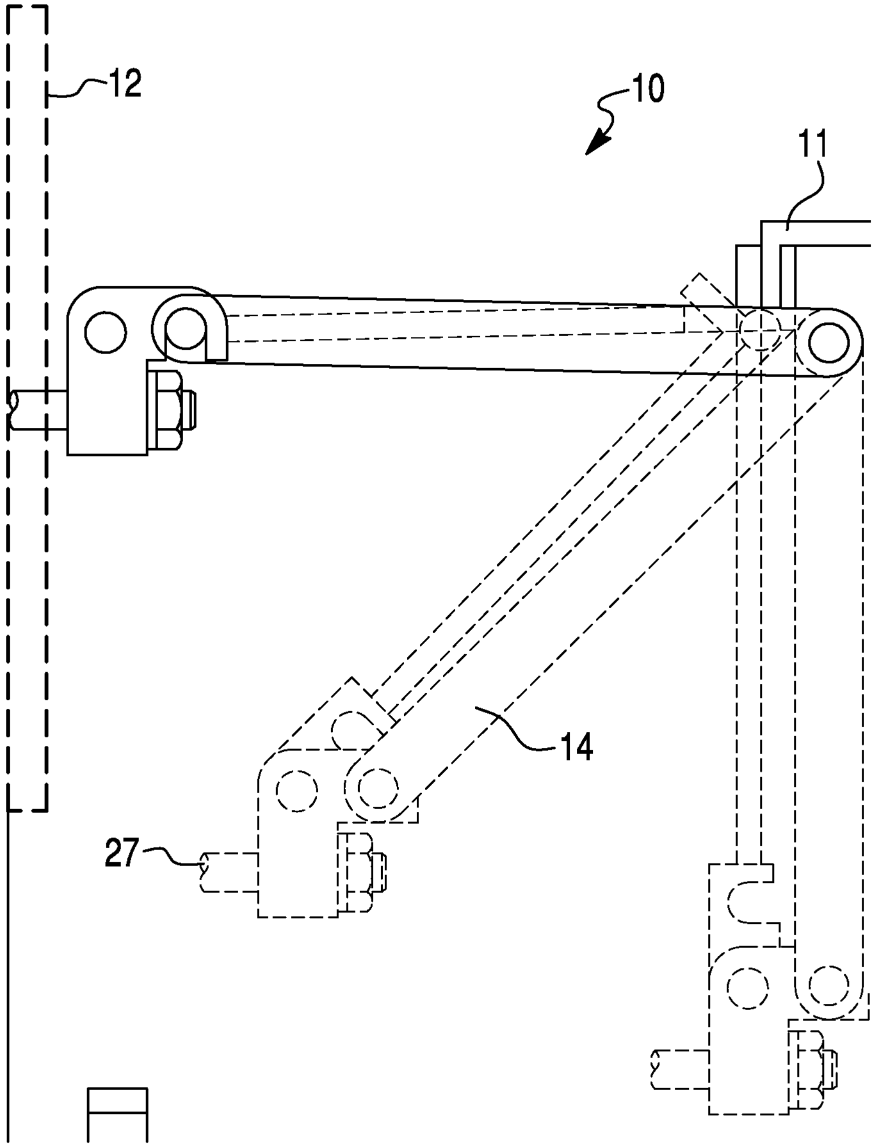
FIG. 6 is a view of the collapsing mechanism of the ergonomic chair of FIG. 5.

Referring to FIG. 6, a view of right side axle structure collapsing positions of the ergonomic chair 10 of FIG. 5 shows the collapsible axle structure 14 fully collapsed, partially collapsed, and fully extended. The wheel axles 27 remain parallel during the collapsing movement. The collapsible axle structure 14 can be coupled to the frame 11 either on the forward end of the frame 11 or positioned underneath and near the forward end of the frame 11.

Figure 7:
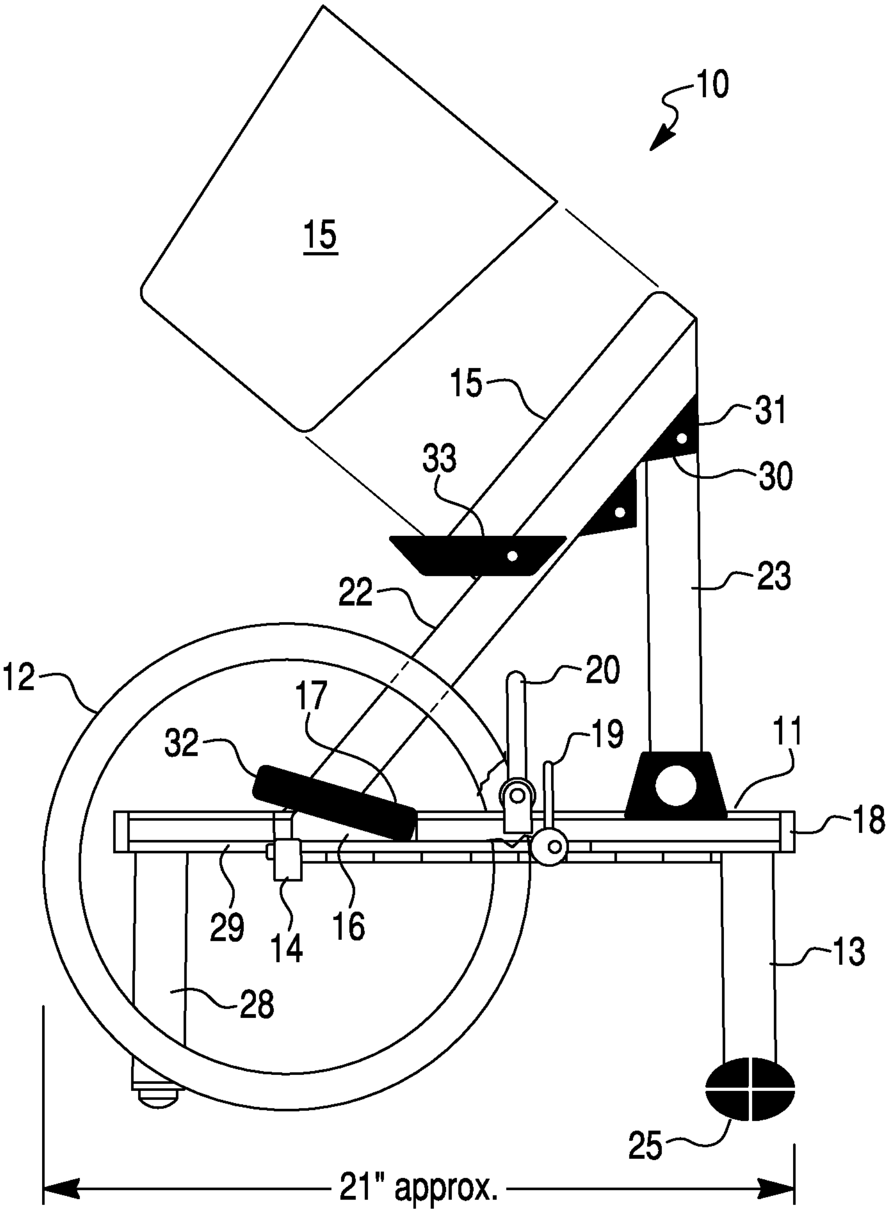
FIG. 7 is a left side view of an ergonomic chair of the present invention with a rear caster and for a tilt guard with ball transfer.

FIG. 7 is a right side view of an ergonomic mobility chair 10 of the present invention comprising a frame 11, two primary wheels 12, a secondary load-bearing support 13 with a rear caster 25 comprising a relatively small wheel and swivel, and forward tilt guard 28 configured with a ball transfer on the lower end, the tilt guard being coupled to the frame by a position adjuster 29. Alternatively, the tilt guard may be configured with a friction pad that when making contact with a surface slows and stops forward momentum. The primary wheels 12 are usable for hand propulsion of the chair 10 and positioned forward of the center of gravity of the chair 10. The primary wheels 12 are mounted on a collapsible axle structure 14 coupled to the frame 11. The secondary load-bearing support 13 is positioned aft of the center of gravity of the chair 10 and coupled to the frame 11. A seat 15 and two knee supports 16 & 17 are coupled to the frame 11, the seat 15 and the knee supports 16 & 17 being arranged with respect to one another so as to position a user (not shown) of the chair in a kneeling, upright, and generally neutral physiologic position. The seat 15 and the knee supports 16 & 17 each comprise at least a comfort cushion support coupled to the frame 11 of the chair 11 by the leg support 23. A bumper guard 18 is coupled to the aft end of the frame 11. An eccentric friction brake 19 with collapsible handle for slowing or preventing movement of chair 10 is shown positioned aft of the primary wheels 12. A platform stabilizer clamp 20 for locking the collapsible axle structure 14 in an outwardly extended position is shown approximately centered between the forward and aft ends of the frame 11. A seat 15 mounting post 22 and support post 23 are shown as rotatable structures for positioning the seat 15 at an angle between approximately 45 degrees and 60 degrees with respect to the frame 11. The distal end of the seat support post 23 is rotated forward to increase the seating angle and height with respect to the centerline of the frame. After rotation, the distal end of the seat support post 23 is secured to the seat mounting post 22 by a locking member 30 being selectively engageable with one of a plurality of connection points 31 formed on the seat mounting post 22. The knee supports 16 & 17 are coupled to the frame 11 by a flexible device creating a pivot point knee elevator 32 that can be raised and lowered and rotated towards and away from the seat 15 of the chair 10 about a generally horizontal axis. Hand supports 33 are coupled to the seat mounting post 22 by a flexible device creating a pivot point and can be rotated towards and away from the seat 15 of the chair 11 about a generally horizontal axis.

Figure 8:
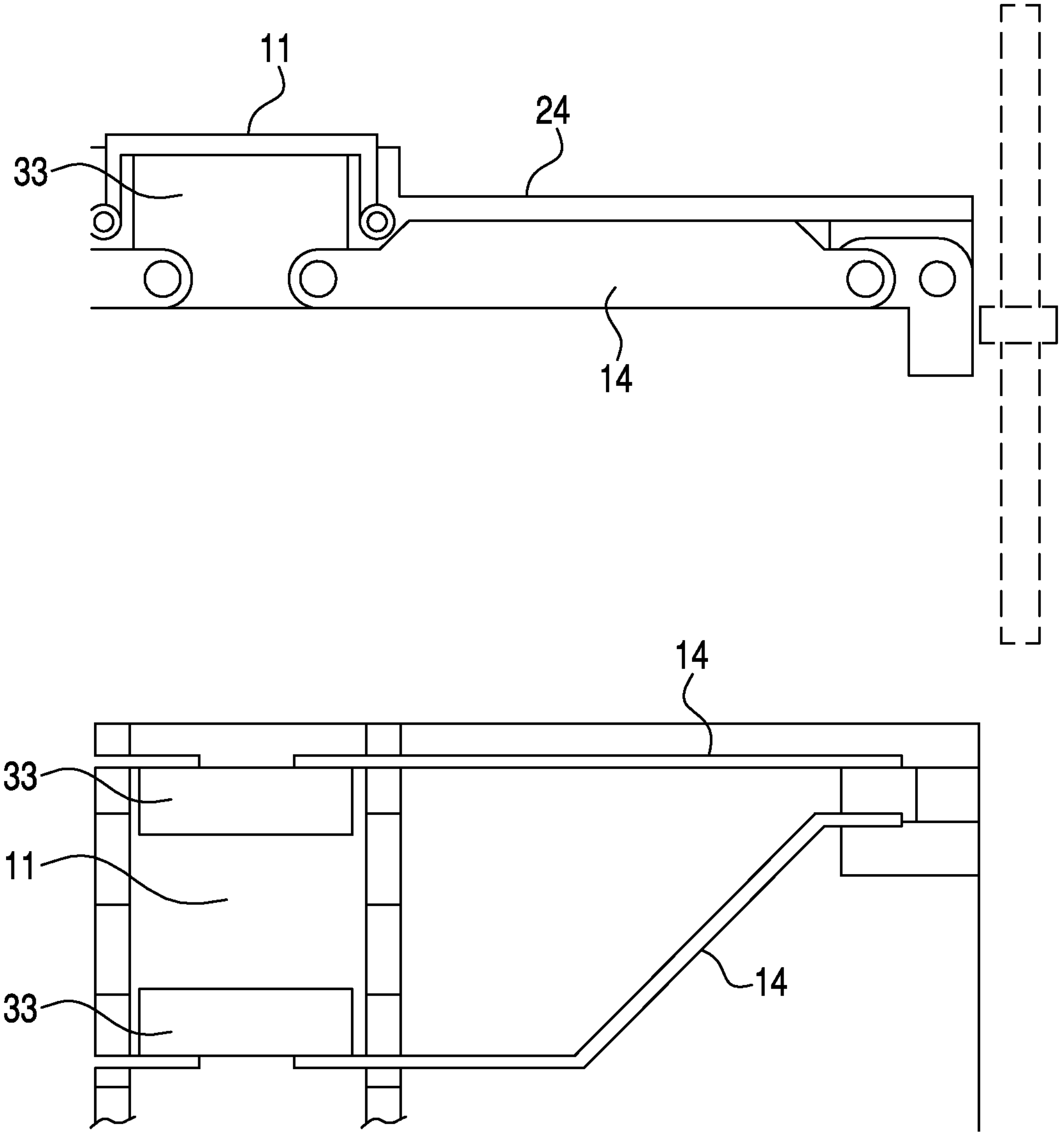
FIG. 8 is a view of the collapsing mechanism of the ergonomic chair of FIG. 7.

Referring to FIG. 8, the left side collapsing mechanism of the ergonomic chair of FIG. 7 is shown in front and bottom views. The collapsible axle structure 14 is shown coupled to the frame 11 by attachment blocks 33 positioned underneath and near the forward end of the frame 11.

The structural components of the present invention may comprise a plurality of materials including aluminum, steel, plastic, and composites. The seat and knee cushions may comprise closed cell foam covered with a moisture proof material and a removable mesh. The primary wheels may be approximately 20' inches in diameter and comprise polyurethane, high tread, flat free wheels. Casters may be 5 to 7 inches in diameter and comprise polyurethane. When the secondary load-bearing rolling point device is configured with a caster, a height adjuster may be included. The wheels and ball transfer or caster should be rated to support a chair user weighing least 250 pounds.

Although specific embodiments have been illustrated and described herein, it will be appreciated by those of ordinary skill in the art that any arrangement that is calculated to achieve the same purpose may be substituted for the specific embodiments shown.

What is claimed is:

1. An ergonomic mobility chair comprising a frame; two primary wheels usable for hand propulsion of the chair each of said primary wheels mounted on an end portion of a transverse-axle structure horizontally coupled to a forward portion of the frame; at least one secondary load-bearing support positioned aft of the primary wheels and coupled to the frame; a seat and two knee supports coupled to the frame, the seat and the knee supports being arranged with respect to one another so as to position a user of the chair in a kneeling, upright, and generally neutral physiologic position, wherein the seat is positioned aft of the axle structure;

wherein the seat is mounted on an angularly rotatable first support structure connectable to a second support structure;

wherein a distal end of the second support structure is rotatable forward to increase the seating angle with respect to a longitudinal centerline of the frame; and wherein the structural components may comprise a plurality of materials including at least one of aluminum, steel, plastic, and composites.

2. The ergonomic mobility chair of claim 1, wherein the seat of the chair is adjustably coupled to the frame by means of a height adjustment mechanism, comprising a first support post for mounting the seat and coupled to the frame by a flexible device creating a pivot point, a second support post located substantially below the seat and coupled to the frame by a flexible device creating a pivot point.

3. The ergonomic chair of claim 2 wherein hand supports are coupled to the first support post by a flexible device creating a pivot point and can be rotated towards and away from the seat of the chair about a generally horizontal axis.

4. The ergonomic mobility chair of claim 1 wherein the axle structure is collapsible and maintains the wheels parallel to each other during collapsing operation.

5. The ergonomic chair of claim 4 wherein the collapsible axle structure is coupled to the frame on the forward end of the frame.

6. The ergonomic chair of claim 5 wherein the collapsible axle structure is coupled to the frame underneath and near the forward end of the frame.

7. The ergonomic chair of claim 1 wherein the knee supports are coupled to the frame by a flexible device creating a pivot point and can be rotated towards and away from the seat of the chair about a generally horizontal axis.

8. The ergonomic mobility chair of claim 1 wherein the at least one secondary load-bearing support further comprises one of a ball transfer and a caster.

9. The ergonomic mobility chair of claim 1 wherein the knee supports are coupled to the frame by a hinged mechanism comprising part of the collapsible axle structure.

10. The ergonomic mobility chair of claim 1 further comprising a forward tilt guard with one of a ball transfer, a caster, and a friction pad, the tilt guard being coupled to the frame by one of a static connector and a position adjuster.

11. The ergonomic chair of claim 1 wherein the structural components may comprise a plurality of materials including aluminum, steel, plastic, and composites.

12. An ergonomic mobility chair comprising a frame; two primary wheels usable for hand propulsion of the chair and mounted on an axle structure coupled to a forward portion of the frame; at least one secondary load-bearing support positioned aft of the primary wheels and coupled to the frame; a seat and two knee supports coupled to the frame, the seat and the knee supports being arranged with respect to one another so as to position a user of the chair in a kneeling, upright, and generally neutral physiologic position;

wherein the seat is positioned aft of the axle structure;

wherein the seat of the chair is adjustably coupled to the frame by means of a height adjustment mechanism, comprising a first support post for mounting the seat and coupled to the frame by a flexible device creating a pivot point, a second support post located substantially below the seat and coupled to the frame by a flexible device creating a pivot point;

wherein a distal end of the second support post is rotated forward to increase the seating angle with respect to a longitudinal centerline of the frame, the distal end of the second support post being secured to the first support post after rotation by a locking member being selectively engageable with one of a plurality of connection points formed on the first support post, and wherein the seat and the knee supports each comprise at least a comfort support coupled to the frame of the chair.

13. An ergonomic mobility chair comprising a frame; two primary wheels usable for hand propulsion of the chair and mounted on a collapsible axle structure coupled to the of forward portion the frame; at least one secondary load-bearing support positioned aft of the primary wheels and coupled to the frame; a seat and two knee supports coupled to the frame, the seat and the knee supports being arranged with respect to one another so as to position a user of the chair in a kneeling, upright, and generally neutral physiologic position;

wherein the seat has a positioning range aft of the axle structure at angles between approximately 45 degrees and 60 degrees with respect to said frame;

wherein the seat is adjustably coupled to the frame by means of a height adjustment mechanism, comprising a first support post for mounting the seat and coupled to the frame by a flexible device creating a pivot point, a second support post located substantially below the seat and coupled to the frame by a flexible device creating a pivot point;

wherein a distal end of the second support post is rotated forward to increase the seating angle with respect to a longitudinal centerline of the frame, the distal end of the second support post being secured to the first support post after rotation by a locking member being selectively engageable with one of a plurality of connection points formed on the first support post;

wherein the collapsible axle structure maintains the wheels parallel to each other during collapsing operation, and wherein the at least one secondary load-bearing support is coupled to the frame of the chair and includes one of a ball transfer and caster.

14. The ergonomic chair of claim 13, wherein the knee supports are coupled to the frame by a flexible device creating a pivot point and can be rotated towards and away from the seat of the chair about a generally horizontal axis.

15. The ergonomic mobility chair of claim 14, wherein the knee supports are coupled to the frame by a hinged mechanism comprising part of the collapsible axle structure.

16. The ergonomic mobility chair of claim 13, further comprising a forward tilt guard with one of a ball transfer, a caster, and a friction pad, the tilt guard being coupled to the frame by one of a static connector and a position adjuster.

17. The ergonomic chair of claim 13, wherein hand supports are coupled to the first support post by a flexible device creating a pivot point and can be rotated towards and away from the seat of the chair about a generally horizontal axis.

18. The ergonomic chair of claim 13, wherein the collapsible axle structure is coupled to the frame on the forward end of the frame.

19. The ergonomic chair of claim 13, wherein the collapsible axle structure is coupled to the frame underneath and near the forward end of the frame.

* * * * *